United States Patent [19]

Raymond et al.

[11] Patent Number: 4,862,732
[45] Date of Patent: Sep. 5, 1989

[54] LEAK TESTING

[75] Inventors: Samuel O. Raymond, North Falmouth; William Hulsman, Woods Hole; Caleb Warner, Lexington, all of Mass.

[73] Assignee: Benthos, Inc., N. Falmouth, Mass.

[21] Appl. No.: 109,928

[22] Filed: Oct. 19, 1987

[51] Int. Cl.[4] .............................. G01M 3/36
[52] U.S. Cl. .................................... 73/45.4
[58] Field of Search .................. 73/45.4, 49.3, 52

[56] References Cited

U.S. PATENT DOCUMENTS

| | | | |
|---|---|---|---|
| 3,847,014 | 11/1974 | Mistarz | 73/45.4 X |
| 3,918,293 | 11/1975 | Feigel | 73/49.3 |
| 4,024,956 | 5/1977 | Cassidy | 209/73 |
| 4,148,213 | 4/1979 | Prakken | 73/45.4 |
| 4,188,819 | 2/1980 | Egee et al. | 73/52 |
| 4,510,730 | 4/1985 | Edmondson | 53/53 |
| 4,649,740 | 3/1987 | Franklin | 73/49.3 |
| 4,697,452 | 10/1987 | Prakken | 73/49.3 |
| 4,706,494 | 11/1987 | Creed et al. | 73/52 X |
| 4,715,215 | 12/1987 | Perhach et al. | 73/45.4 |
| 4,756,184 | 7/1988 | Reishus et al. | 73/45.4 X |

FOREIGN PATENT DOCUMENTS

| | | | |
|---|---|---|---|
| 2422526 | 11/1975 | Fed. Rep. of Germany | 73/49.3 |
| 2351400 | 12/1977 | France | 73/49.3 |
| 2059381 | 4/1981 | United Kingdom | 73/49.3 |

Primary Examiner—Stewart J. Levy
Assistant Examiner—Joseph W. Roskos

[57] ABSTRACT

The leaky or non-leaky condition of a flexible, closed container is tested by increasing the pressure within the container (by causing motion of a wall of the container), and monitoring the resulting rate of change of a predetermined parameter (wall position or force exerted by the wall); the monitored rate of change indicates the leaky or non-leaky condition. In another aspect the time-varying net force on a container is the basis for determining the leaky or non-leaky condition.

34 Claims, 4 Drawing Sheets

LEAK TESTING

BACKGROUND OF THE INVENTION

This invention relates to testing the leaky or non-leaky condition of a flexible, closed container.

It is known to test for leaks in a flexible package (for example a sealed potato chip bag) by resting a weight on the package and measuring the resulting thickness of the compressed package, then repeating the measurement, and finally comparing the two measures of thickness as an indication of the leakage of air from the package. (Franklin, U.S. Pat. No. 4,649,740).

In another technique, the hermetic seal of a food packet is tested by compressing the packet for a period of time between two moving pressure members. A leak is detected if the "pair of members have moved towards one another by more than a predetermined amount by the [end of the] time [period]" (Edmondson, U. S. Pat. No. 4,510,730, col. 1, 1.42). Flexible packages may also be tested for leaks by applying a fluid pressure driven ram at a fixed reaction pressure and detecting "movement of the ram beyond a pre-set limit point . . . as an indication of pressure leak in the package . . . " (Feigel, U.S. Pat. No. 3,918,293, Abstract).

Yet another approach measures how far a package expands in one direction when compressed in another direction (Cassidy, U.S. Pat. No. 4,024,956).

It is also known to test the vacuum integrity of a container having a snap action diaphragm by detecting the speed of inward motion of the diaphragm after it has been pulled to an outward position (Egie, U.S. Pat. No. 4,188,819).

SUMMARY OF THE INVENTION

In general, in one aspect the invention features testing the leaky or non-leaky condition of a flexible, closed container by increasing the pressure within the container (by causing motion of a wall of the container) and monitoring, while the pressure is being increased, the resulting rate of change of a predetermined parameter that is dependent on the leaky or non-leaky condition of the container; the monitored rate of change indicates the leaky or non-leaky condition.

Preferred embodiments of the invention include the following features.

In some embodiments, the predetermined parameter is the position of the wall of the container. In other embodiments, it is the force exerted by a wall of the container. The leaky or non-leaky condition is determined by comparing the monitored rate of change of the parameter with a predetermined reference value.

To monitor the rate of motion, a proximity detector and an associated detectable element (e.g., a metal plate) are mounted in such a way that the rate of change in distance between the detectable element and the proximity detector corresponds to the rate of change of position of the container wall. The proximity detector continually senses the distance to the detectable element and the rate of change of distance is determined accordingly. A severely leaky condition is determined by comparing the monitored distance of travel with a predetermined threshold. The rate of motion is sampled and the determination is based on the sample.

The pressure within the container is increased by a squeezer that includes a plunger and an air cylinder for applying pressure to cause the plunger to bear against the container wall. The proximity detector and the detectable element are mounted respectively on a movable portion and a fixed portion of the air cylinder.

A conveyor moves the container past the squeezer. The squeezer stops the motion of the container relative to the conveyor during the testing without requiring the conveyor to be stopped. A rejection device mechanically rejects leaky containers.

For testing a series of containers carried along a conveyor there is branching equipment for routing at least some of the containers along a first testing branch and for routing at least some other containers along a second testing branch, and the squeezer is adapted for testing containers on both branches so that the period available for testing each container is increased. The squeezer tests the containers alternately on the two branches. Alternatively, a rotating structure temporarily diverts the containers on a generally circular detour from the conveyor and a number of squeezers are mounted about the axis of the rotating structure to move in synchronism with the container.

In embodiments based on the force exerted by the wall of the container, the sensor is a force transducer (e.g., a strain gauge); a plunger of the squeezer is arranged to remain in a fixed position relative to the container, and the sensor monitors the rate of change of force while the plunger is in its fixed position. The container is determined to be not leaky if the monitored rate of change of force remains zero, and to be leaky if the monitored rate of change is non-zero, or if the force itself is below a predetermined threshold.

In another aspect, the invention features testing the leaky or non-leaky condition by applying a time-varying force on the container with the container exerting a corresponding restoring force that varies over time in a manner that depends on the leaky or non-leaky condition; the time-varying net force on the container is sensed (the net force comprises the time-varying applied force net of the time-varying restoring force); and the leaky or non-leaky condition is determined based on the sensed time-varying net force.

Preferred embodiments include the following features.

The time-varying force includes a peak at a predetermined time; and the circuitry determines the leaky or non-leaky condition based on matching the predetermined time with a time of occurrence of a corresponding peak in the net force, or on the level of the corresponding maximum of the net force. The squeezer includes a pair of wheels rotating about spaced apart axes, the container being passed between the wheels for squeezing.

The invention tests leaks simply, quickly, accurately, and economically, without harming the container. A variety of containers may be tested. Normal variations in package size do not affect the test because it depends either upon the rate of motion of the wall of the container or the force profile, not how far it is compressed. The system can be added to any conveyor and occupies only a short length of the processing line. Only one measuring station is required and the conveyor need not be stopped during testing. No measurements need to be stored. Very small leaks can be detected.

Other advantages and features will become apparent from the following description of the preferred embodiment, and from the claims.

DESCRIPTION OF THE PREFERRED EMBODIMENT

We first briefly describe the drawings.

STRUCTURE AND OPERATION

Figure 1:
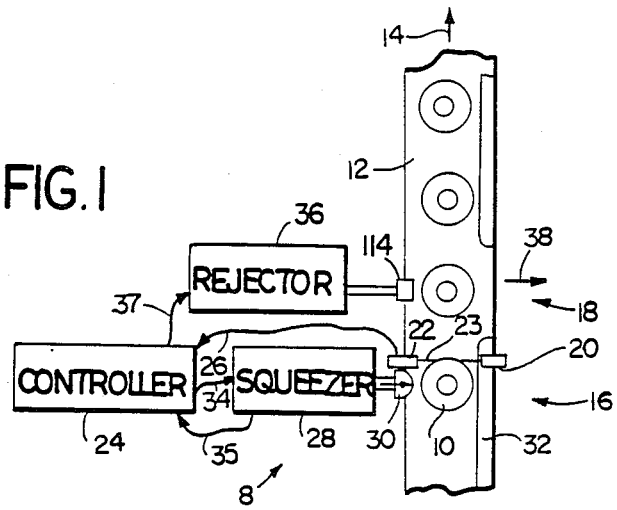
FIG. 1 is a plan view of a leak testing system.

Referring to FIG. 1, in a leak testing system 8, a series of capped flexible polyethylene bottles 10 to be tested for leaks are carried on a conveyor belt 12 (moving in direction 14) past a leak testing station 16 and then past a rejection station 18.

Figure 2A:
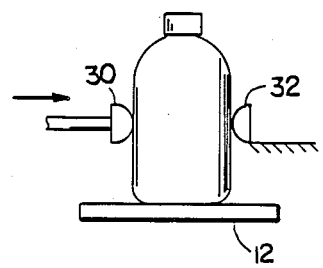
FIGS. 2A, 2B are side views of a bottle at two successive stages of testing.
Figure 2B:
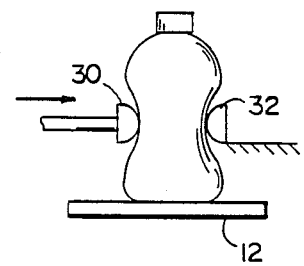

When a bottle reaches leak testing station 16, it interrupts a light beam 23 aimed from a light source 20 to a photodetector 22. A controller 24 detects interruption of the light beam via line 26 and starts a leak testing cycle. As part of the testing cycle, controller 24 first causes a squeezer 28 to drive a plunger 30 into the side wall of the bottle forcing it (as seen in FIG. 2A) against an anvil 32 held in a fixed position on the opposite side of the conveyor belt. Plunger 30 then continues to squeeze the bottle harder against the anvil (as seen in FIG. 2B).

If the bottle has no leak, plunger 30 will eventually reach a point in its travel where (because of the resistance of the sealed bottle) it can move no further (except for possibly a very slow motion resulting from plastic creep). Controller 24 detects this condition over line 34 as an indication that the bottle is not leaky, and retracts plunger 30. The bottle, which had been temporarily stopped from moving in direction 14, then resumes its travel past rejection station 18.

On the other hand, if the bottle is leaky, plunger 30 will first move relatively rapidly toward anvil 32, squeezing the bottle. Eventually the plunger reaches a point where the bottle, although offering substantial resistance to the motion of the plunger, will (because of the leak) allow the plunger to continue to move toward the anvil at a slow relatively constant speed. Controller 24 detects the slow constant speed as an indication of a leak. Plunger 30 is then withdrawn. After a delay period corresponding to the time it takes the bottle to reach rejection station 18, controller 24 triggers (via line 37) a rejector 36 to push the bottle off conveyor belt 12 (as suggested by arrow 38).

Figure 3:
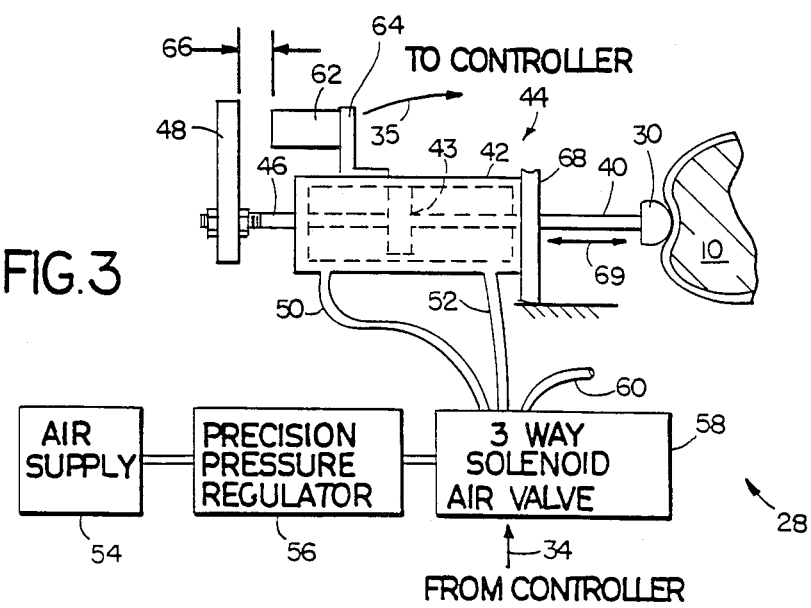
FIG. 3 is a top view of the squeezer of FIG. 1.

Referring to FIG. 3, plunger 30 is attached via a piston rod 40 to a movable piston 43 inside a cylinder 42 (shown in dashed line). A threaded shaft 46 is also attached to piston 43 and extends in the opposite direction through the end of cylinder 42. A metal plate 48 is bolted to the end of rod 46.

Two air lines 50, 52 are connected respectively to opposite ends of cylinder 42. Pressurized air in line 50 effectively drives piston 43 (and hence plunger 30) to the right. Conversely, pressurized air in line 52 drives plunger 30 to the left. Pressurized air for lines 50, 52 is provided from an air supply 54 via a precision pressure regulator 56 and a 3-way solenoid air valve 58. Air valve 58 is governed by controller 24 (FIG. 1) via line 34 to switch pressurized air to either line 50, line 52, and from air cylinder 42 to an exhaust line 60.

A proximity detector 62 (mounted on cylinder 42 by using a bracket 64) delivers a signal on line 35 that is proportional to the size of the gap 66 between the detector 62 and metal plate 48. Cylinder 42 is held in place by a fixed support 68 having a hole (not shown) through which piston rod 40 may move freely back and forth as indicated by arrows 69.

Figure 4:
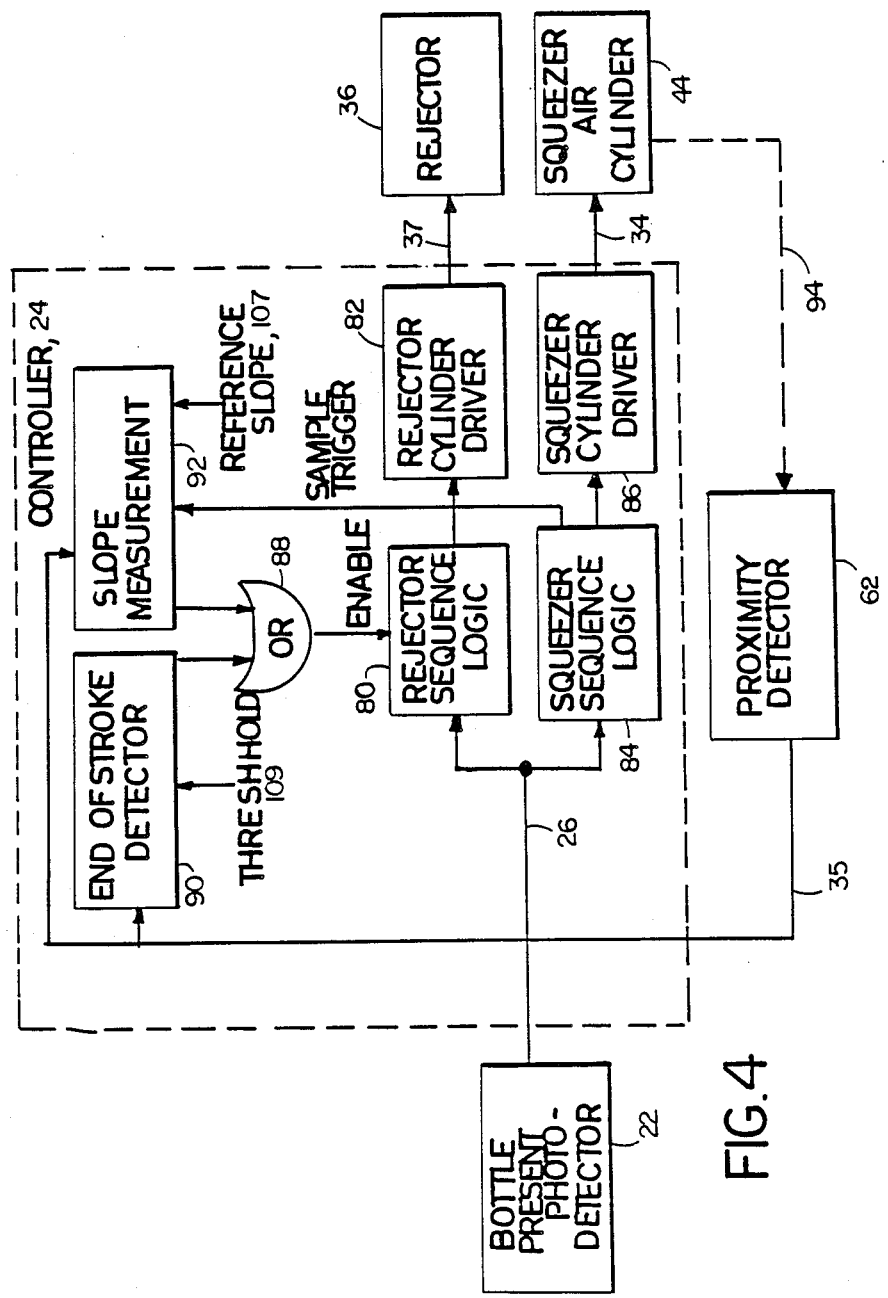
FIG. 4 is a block diagram of the controller of FIG. 1.

Referring to FIG. 4, controller 24 includes (i) rejector sequence logic 80 (which triggers the operation of a rejector cylinder driver circuit 82 to control rejector 36 over line 37) and (ii) squeezer sequence logic 84 (which triggers the operation of a squeezer cylinder driver circuit 86) to control the operation of squeezer air cylinder 44 via line 34.

Rejector sequence logic 80 is enabled by a signal from the output of an OR circuit 88 when either of two leaky bottle conditions exist: (i) piston rod 46 has reached the end of its stroke, as determined by an end of stroke detector 90 based on the proximity detector signal on line 35 (indicating that the bottle has such a large leak that it cannot effectively resist the motion of plunger 30 to any degree); or (ii) plunger 30 is moving at a slow relatively constant rate, as determined by a slope measurement circuit 92 based on the line 35 signal (indicating a bottle with a relatively small leak).

Dashed line 94 represents the feedback effect that the motion of piston rod 46 has on proximity detector 62.

Figure 5:
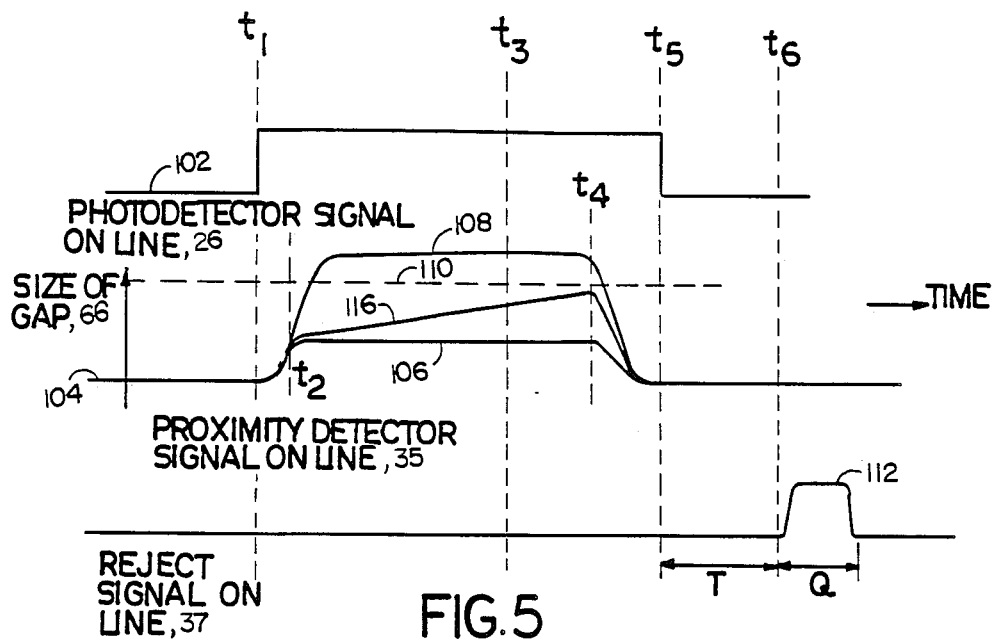
FIG. 5 is a timing diagram for FIG. 4.

Referring to FIG. 5, in operation, when a bottle reaches the photodetector at leak testing station 16 (at time $t_l$) the photodetector signal 102 goes high. Squeezer sequence logic 84 triggers squeezer air cylinder 44 to drive plunger 30 against the bottle. The proximity detector signal 104 rises rapidly until plunger 30 reaches a position (at time $t_2$) where, in the case of a non-leaky bottle, the plunger is unable to advance. Signal 104 then remains constant (slope $=0$) at level 106. At time $t_3$ (determined by a signal from squeezer sequence logic on line 105 — FIG. 4), the slope of curve 106 is sampled and compared with a reference slope 107 (by slope measurement detector 92 — FIG. 4) as an indication of the leaky or non-leaky condition of the bottle. If the slope exceeds the reference slope, a signal is sent to OR gate 88; otherwise not. At time $t_4$ (i.e., a predetermined period after $t_l$), squeezer sequence logic 84 causes the plunger to be retracted, allowing the bottle to proceed along the conveyor to a point (at time $t_5$) where the photodetector signal goes low again. At a later time (not shown), when the next bottle reaches the leak testing station, the photodetector signal goes high and the test cycle repeats.

In the case of a severely leaky bottle, the plunger encounters little resistance from the bottle and the proximity detector signal rises rapidly to level 108. As it rises, it passes a threshold level 110. End of stroke detector 90 (FIG. 4) continually compares signal 104 with threshold 110 and when the threshold is exceeded determines that the end of stroke has been reached, i.e., the bottle is severely leaky. A signal is sent via OR gate 88 to rejector sequence logic. Rejector sequence logic 80 (FIG. 4) then times an interval T beginning at $t_5$ (when the bottle leaves the leak testing station) and ending at time $t_6$ (when the bottle reaches the rejection station). Interval T is chosen based on the speed of the conveyor and the distance between stations. At time $t_6$, the reject signal 112 is driven high for a short period Q (timed by logic 80), causing the rejector plunger 114 (FIG. 1) to push the defective bottle off the conveyor.

A slightly leaky bottle will allow slow movement of the plunger after time $t_2$ and signal 104 will rise slowly with slope 116. If the slope sampled at $t_3$ is higher than the reference slope, slope measurement circuit 92 (FIG. 4) sends an enable signal via OR gate 88 and the rejection sequence described for the severely leaky bottle is executed.

Figure 6:
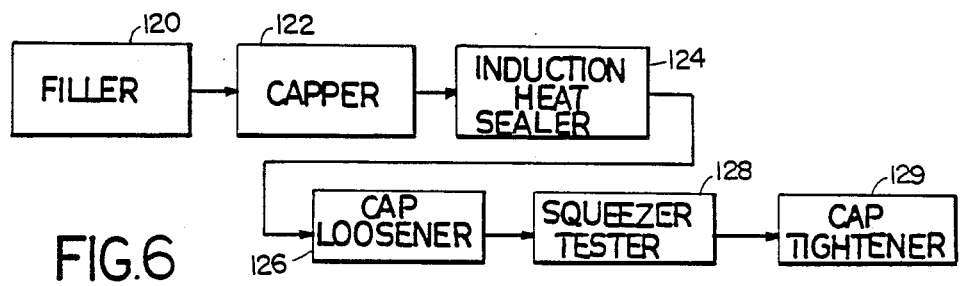
FIG. 6 is a block diagram of a testing system for foil sealed containers.

Referring to FIG. 6, in one application for testing bottles fitted with aluminum foil tamper-evident lids, the bottle passes from a filler 120 to a capper 122 where the plastic lid containing the aluminum foil seal is automatically screwed onto the bottle. Next the capped bottle is passed under an induction heat sealer 124 which melts the adhesive on the underside of the foil seal, causing it to fuse onto the top of the bottle. In a cap loosener 126, the cap is loosened by one-half turn to permit air to escape the bottle if the foil seal is leaky. Next, the leaky condition is tested in a squeeze tester 128, like the tester of FIG. 2. Finally, the loose cap is retightened by cap tightener 129.

Because metal sensing proximity detector 62 (with proper amplification) is extremely sensitive to changes in position, e.g., as small as 0.0005 inch, leaks as small as 0.008 inch diameter in a 1 liter bottle can be detected in 0.3 seconds. The slower the production line, the longer the container can be squeezed and the smaller that leak that can be found.

Other embodiments are within the following claims.

Figure 7:
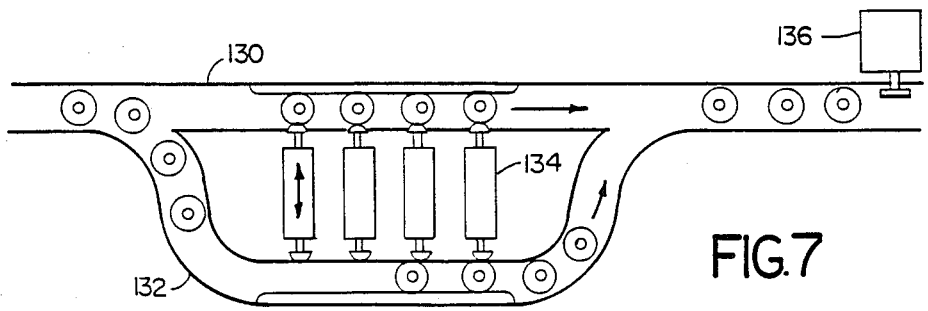
FIGS. 7, 8 are top views of two alternative testing systems for higher speed production lines.

For example, referring to FIG. 7, for squeeze testing on production lines where the bottles are moving rapidly, the line could be split into two branches 130, 132 and a series of, for example, four double ended air cylinders 134, having plungers on both ends, could be used. First, four bottles would be routed to branch 132 and tested by cylinders 134. As those four bottles leave branch 132 after testing (as shown), four other bottles are being tested on branch 130. A single rejector 136, located beyond where the branches rejoin, serves to reject unacceptable bottles from both branches.

Figure 8:
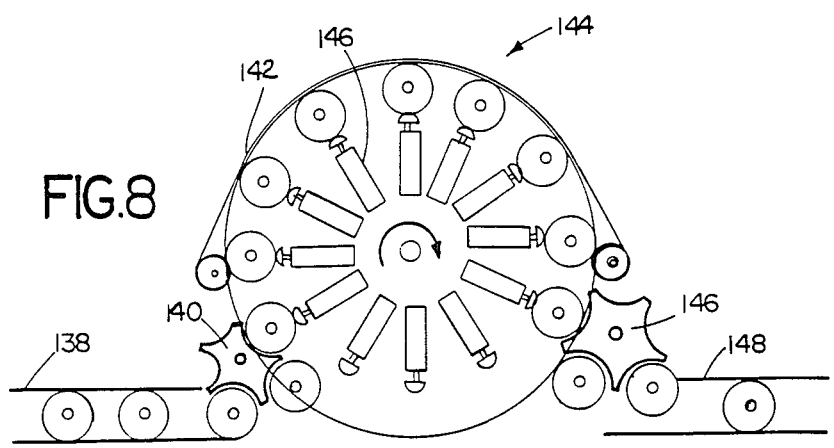

Referring to FIG. 8, in another arrangement to accommodate a high speed line, the bottles are picked up from the conveyor 138 by a star wheel 140 and delivered to a driven belt 142 which moves the bottles around a rotating cylindrical test station 144. Station 144 includes twelve squeezer air cylinders 146 that move in unison with the bottles so that each cylinder may be testing an associated bottle as the bottles move around the test station. This increases the time during which the testing may proceed. A second star wheel 146 unloads the bottles back onto a downstream conveyor belt 148.

Many kinds of sealed containers may be leak tested including capped flexible polyethelene bottles containing fluids or dry materials; pouches and bags containing, for example, food; and flexible cups with heat sealed metal foil lids.

Figure 9:
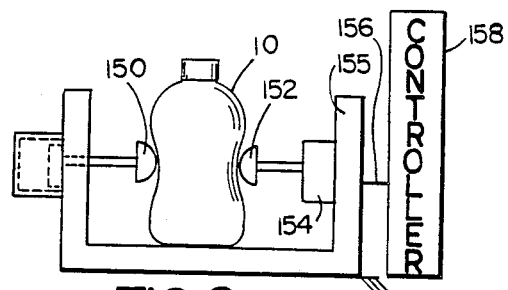
FIGS. 9, 10 are side views of alternative testing systems based on force measurements.

Referring to FIG. 9, in an alternative scheme for leak testing, a plunger 150 is driven into the side wall of bottle 10 until it reaches a fixed position at the end of its stroke. An anvil 152 on the other side of the bottle is mounted via a force transducer 154 to a rigid support 155. While the plunger 150 is positioned at the end of its stroke, the force transducer 154 delivers signals over a line 156 to a controller 158 that is similar to controller 24 (FIG. 4). Controller 24 triggers a rejection of the bottle as being leaky if either (a) the rate of change of force is non-zero (e.g., declining slowly) indicating that there is a slow leak, or (b) the force is below a small threshold value indicating that there is a severe leak.

Figure 10:
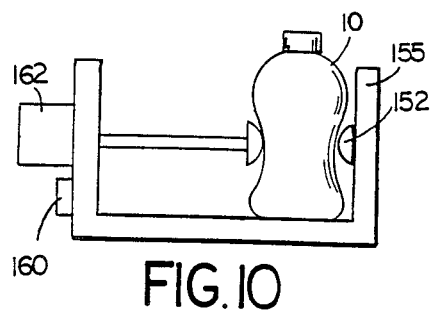

Referring to FIG. 10, alternatively anvil 152 can be attached directly to a rigid support 155 and the force can be measured by a strain gauge 160 mounted on the support near the air cylinder 162.

Figure 11:
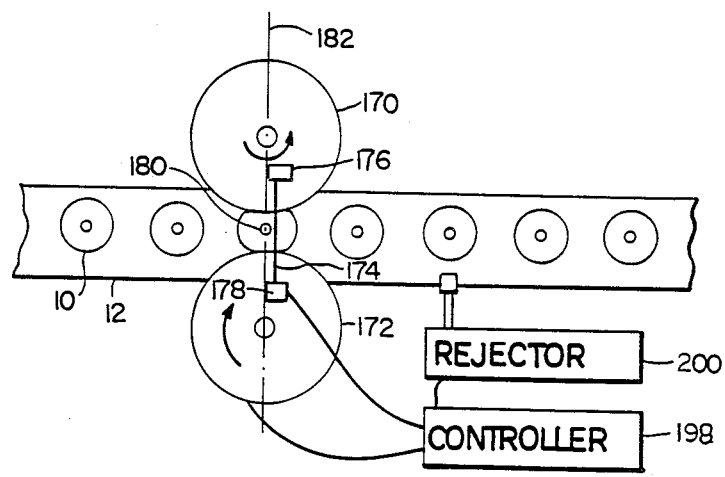
FIGS. 11, 12 are top and end views of an alternative testing technique.
Figure 12:
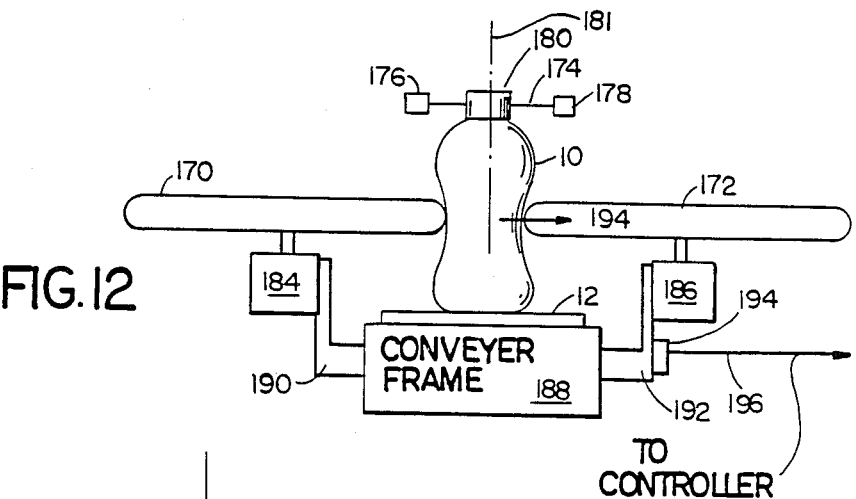

Referring to FIGS. 11, 12, in yet another technique for leak testing, each bottle 10 passing along conveyor belt 12 is squeezed between a rotating anvil wheel 170 and a rotating sensor wheel 172. An infrared beam 174 (which passes from an infrared source 176 to an infrared detector 178) is broken by the lid 180 when the bottle reaches a position at which its centerline 181 is exactly at the centerline 182 between the rotational axes of wheels 170, 172.

Wheels 170, 172 are driven synchronously (in the directions indicated by the arrows and such that the tangential speed at their outermost diameters is the same as the linear speed of the conveyors) by two stepper motors 184, 186 which are mounted on conveyor frame 188 using two brackets 190, 192. Bracket 190 is rigid but bracket 192 is sufficiently flexible to be bent in response to restoring force 194 imparted by bottle 10 when it is squeezed. A strain gauge 194 mounted on the flexible arm of bracket 192 delivers a signal on line 196 to a controller 198. Controller 198 is also connected to motors 182, 184, to detector 178 and to a bottle rejector 200 (like rejector 36, FIG. 1).

Wheels 170, 172 act to apply a time-varying force on the bottle that first rises to a peak value at the instant when the centerline of the bottle is at the centerline between the wheels; the time-varying force is symmetrical with respect to that instant. How the bottle reacts to that force will depend on its leaky or non-leaky condition.

Figure 13:
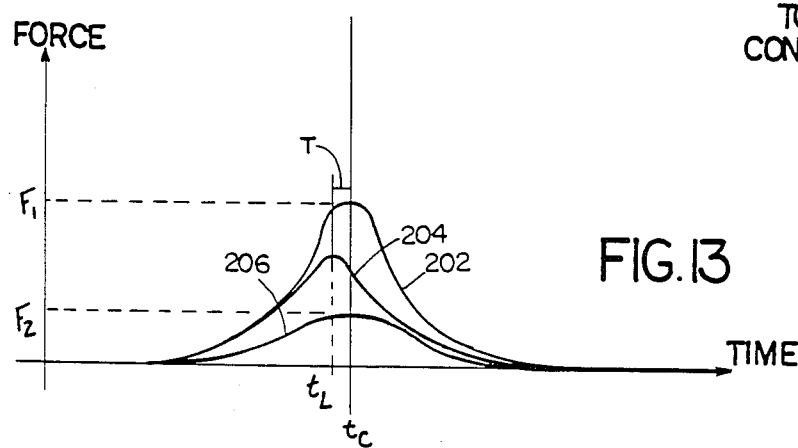
FIG. 13 shows graphs of force against time for the technique of FIGS. 11, 12.

Referring to FIG. 13, the output signal of strain gauge 194 (representing force) over time will indicate the leaky condition of bottle 10.

A non-leaky bottle will cause the strain gauge signal to follow, e.g., curve 202 with the force reaching a peak at time $t_c$, i.e., the time (indicated by a signal from infrared detector 178) when the centerline of the bottle is at the centerline between the wheels. Furthermore, curve 202 is generally symmetrical on either side $t_c$. A slightly leaky bottle will generate a curve like 204 which peaks at time $t_e$ (an interval T earlier than $t_c$) and is not symmetrical on either side of $t_c$. This is so because as the leaky bottle begins to be squeezed it reaches a point (ahead of $t_c$) at which the leakage of air through the leak relieves the force sufficiently to cause the peak to appear at $t_c$.

A severely leaky bottle would generate curve 206 based solely on the resilience of the bottle itself; the air within the bottle is not able to provide any resistance. While symmetrical about $t_c$ (like curve 202), the peak force $F_2$ of curve is substantially lower than $F_1$.

Controller 200 is wired to detect a leaky bottle when either (a) the peak force occurs more than some threshold interval earlier than time $t_c$, (slightly leaky) or (b) the peak force is lower than some threshold (severely leaky). In either case rejector 200 is triggered.

Alternatively, controller 198 can be arranged to stop the wheels, and hence the bottle, very briefly (e.g., 0.3 sec.) when it is at the centerline location; if the force decays slowly during that period, a slight leak is indicated.

We claim:

1. Apparatus for testing the leaky or non-leaky condition of a flexible, closed container, comprising:
    a squeezer for increasing the pressure within the container by causing motion of a wall of the container,
    a sensor adapted for monitoring, while said squeezer is operating, a predetermined parameter that is dependent on the leaky or non-leaky condition of said container, and
    circuitry for sampling the rate of change of said parameter at a predetermined point in time and for determining said leaky or non-leaky condition based on said sampled rate.

2. The apparatus of claim 1 wherein said predetermined parameter comprises the position of a wall of said container.

3. The apparatus of claim 1 wherein said circuitry determines said leaky or non-leaky condition by comparing said sampled rate with a predetermined reference value.

4. The apparatus of claim 1 wherein said predetermined parameter comprises the force exerted by a wall of said container.

5. The apparatus of claim 4 wherein said sensor comprises a force transducer, a plunger of said squeezer is arranged to reach and remain in a fixed position relative to said wall of said container, and said sensor monitors the rate of change of said force while said plunger is in said fixed position.

6. The apparatus of claim 5 wherein said circuitry determines that said container is not leaky if said monitored rate of change of said force remains zero.

7. The apparatus of claim 6 wherein said circuitry determines that said container is leaky if said monitored rate of change is non-zero.

8. The apparatus of claim 5 wherein said sensor monitors said force and said circuitry also determines that said container is leaky if said force is below a predetermined threshold.

9. The apparatus of claim 5 wherein said sensor comprises a strain gauge.

10. The apparatus of claim 4 wherein said sensor comprises a strain gauge.

11. The apparatus of claim 1 wherein said sensor comprises a proximity detector.

12. The apparatus of claim 11 wherein
    said sensor further comprises a detectable element that cooperates with said proximity detector, and
    said proximity detector and said detectable element are mounted with respect to said squeezer and said container wall in such a way that the rate of change in the distance between said detectable element and said proximity detector corresponds to the rate of change of position of said container wall.

13. The apparatus of claim 12 wherein said proximity detector senses the distance to said detectable element and said sensor further comprises means for determining the rate of change of said distance based on an output of said proximity detector.

14. The apparatus of claim 12 wherein said squeezer comprises an air cylinder with a fixed portion and a plunger movable relative to said fixed portion, and said proximity detector and said detectable element are mounted respectively on said fixed portion and said movable portion.

15. The apparatus of claim 1 wherein said sensor monitors the extent of motion of said wall, and said circuitry determines said leaky or non-leaky condition also by comparing said monitored extent of motion with a predetermined threshold.

16. The apparatus of claim 1 wherein said squeezer comprises a pair of mechanical elements that are spaced apart to define a space for receiving said container, and at least one of said mechanical elements is movable to reduce said space and cause motion of said wall of said container.

17. The apparatus of claim 16 wherein one of said mechanical elements is fixed and the other said mechanical element is movable to reduce said space.

18. The apparatus of claim 16 wherein said movable mechanical element comprises a plunger and said apparatus further comprises means for applying pressure to cause said plunger to bear against said wall.

19. The apparatus of claim 18 wherein said means for applying pressure comprises an air cylinder.

20. The apparatus of claim 1 further comprising a conveyor for moving said container past said squeezer.

21. The apparatus of claim 20 wherein said squeezer stops the motion of said container relative to said conveyor during said testing without requiring that said conveyor be stopped.

22. The apparatus of claim 1 further comprising a rejection device for mechanically rejecting leaky containers in response to said circuitry.

23. The apparatus of claim 1 adapted for testing a series of said containers carried along a conveyor comprising
    branching equipment for routing at least some of said containers along a first testing branch and for routing at least some other said containers along a second testing branch, and wherein
    said squeezer is adapted for testing containers on both said branches whereby the period available for testing each said container is increased.

24. The apparatus of claim 23 wherein said squeezer tests said container alternately on said two branches.

25. The apparatus of claim 1 adapted for testing a series of containers carried along a conveyor, comprising
    means for moving said squeezer in synchronism with said containers whereby the period available for testing is increased.

26. The apparatus of a claim 25 wherein said means for moving comprises a rotating structure for diverting said containers on a generally circular detour from said conveyor, said squeezer being mounted on said rotating structure.

27. The apparatus of claim 26 wherein there are a plurality of said squeezers arranged about the axis of said rotating structure.

28. A method of testing the leaky or non-leaky condition of a flexible, closed container comprising:
    increasing the pressure within the container by causing motion of a wall of the container,
    sampling, at a predetermined point in time while increasing the pressure within the container, the rate of change of a predetermined parameter that is dependent on the leaky or non-leaky condition of the container, and
    determining the leaky or non-leaky condition based on the sampled rate.

29. The method of claim 28 wherein said predetermined parameter comprises the position of a wall of the container.

30. The method of claim 28 wherein said predetermined parameter comprises the force exerted by a wall of the container.

31. Apparatus for testing the leaky or non-leaky condition of a flexible, closed container, comprising
- a squeezer for applying a time-varying force on said container, said container exerting a corresponding restoring force that varies over time in a manner that depends on said leaky or non-leaky condition,
- a sensor for sensing the time-varying net force on said container, said net force comprising said time-varying applied force net of said time-varying restoring force, and
- circuitry for determining said leaky or non-leaky condition based on said sensed time-varying net force.

32. The apparatus of claim 31 wherein said time-varying force includes a peak at a predetermined time, and said circuitry determines said leaky or non-leaky condition based on matching said predetermined time with a time of occurrence of a corresponding peak in said net force.

33. The apparatus of claim 31 wherein said time-varying force includes a peak, and said circuitry determines said leaky or non-leaky condition based on the level of the corresponding maximum of said net force.

34. The apparatus of claim 31 wherein said squeezer comprises a pair of wheels rotating about spaced apart axes, said container being passed between said wheels for squeezing.

* * * * *